March 26, 1940.  R. B. EVERSON  2,195,273

GAS DISPENSING APPARATUS

Filed Oct. 11, 1934

Inventor:
Roy Blair Everson
By:- Cox & Moore
Attys.

Patented Mar. 26, 1940

2,195,273

UNITED STATES PATENT OFFICE 2,195,273

GAS DISPENSING APPARATUS

Roy Blair Everson, Chicago, Ill.

Application October 11, 1934, Serial No. 747,817

10 Claims. (Cl. 210—28)

This invention relates in general to a dispensing apparatus for absorbable commercial gases.

It is an object of this invention to provide a unitary apparatus for the dispensing and absorption of absorbable commercial gases.

Another object of this invention is to provide a unitary apparatus for the purpose of continuously dispensing and absorbing absorbable commercial gases.

It is another object of this invention to provide a compact unitary apparatus for the dispensing and absorption of absorbable commercial gases which will be economical of operation and simple to repair.

It is another object of the invention to provide a compact and economical apparatus for the dispensing and absorption of absorbable commercial gases which shall be exceedingly safe against the dangers of faulty operation, gas leakage, and carelessness.

It is another object of this invention to provide a unitary apparatus for the dispensing of absorbable commercial gases comprising a combination of safety features which will prevent any appreciable escape of the gas should the absorption tank be negligently emptied, or should undue pressures be allowed to pass through the apparatus.

Numerous other objects and advantages will become apparent from a consideration of the following specification:

In general, this invention involves the combination of a gas reservoir and pressure adjusting mechanism together with a gas metering device, a water flow ejector device, an absorbing tower, and a constant level solution tank, in such a manner as to provide for the continuous dispensing and absorption of the gas in a simple, economical and safe manner.

In the accompanying drawing is shown a preferred embodiment of this invention.

Figure 1:
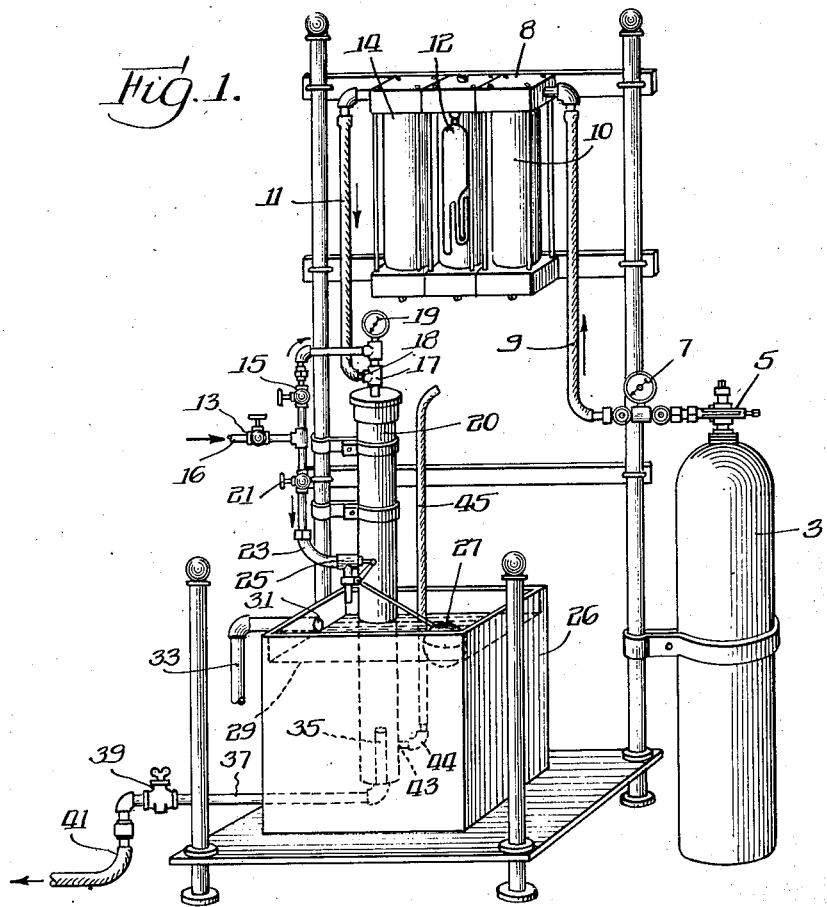
Fig. 1 is a perspective view of said preferred embodiment.
Figure 2:
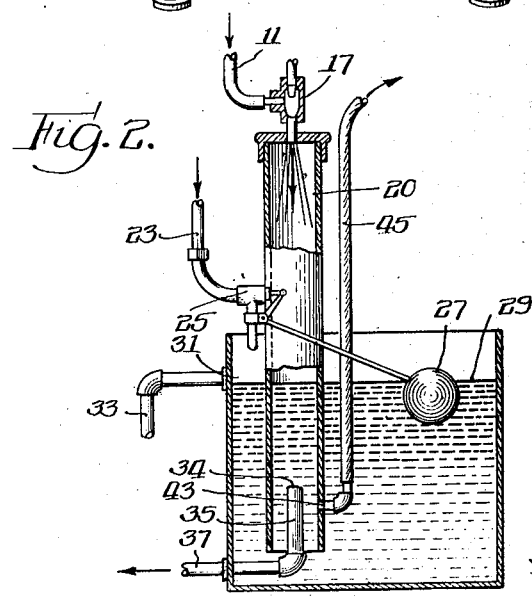
Fig. 2 is a cross-sectional view of the absorbing tower and constant level solution tank.

The preferred embodiment of this invention shown in the drawing comprises a gas reservoir 3. Although many various gases may be dispensed in this apparatus, its operation as a chlorine dispenser will be described below. The reservoir 3 thus would contain chlorine. This reservoir 3 is fitted with a reducing valve and gauge mechanism 5 and 7, respectively, through which chlorine gas may be drawn off in constant flow at reduced pressure into the pipe line 9, whence it passes into the metering mechanism consisting of two auxiliary chambers 10 and 14, and a "bubbler" chamber 12. In this application no claim is made to the invention or inventions embodied within this metering and "bubbler" mechanism, said mechanism being the subject matter of a co-pending application Serial No. 747,815, filed on the 11th day of October, 1934.

The flow of gas through the metering device is maintained by the metering device at a constant measured quantity, and passes therefrom into the pipe line 11, which connects with an ejector mechanism 17. The ejector mechanism is connected also to a gauge 19, and through the valve 15 to the main water supply line 16. The ejector mechanism 17 empties into the absorption tower 20, which extends downwardly to a point in and near the bottom of the solution tank 26. This absorption tower 20 is open at its bottom. The solution tank is provided with a float ball 27, and constant level valve 25, which valve 25 is connected through the pipe line 23 and the valve 21 to the main water line 16. The solution tank is furthermore provided with an overflow pipe 33 opening into the solution tank at 31. The solution tank is also provided with a draw-off line 37 which leads through the valve 39 into the pipe line 41, said pipe line 41 leading to the point of application. The draw-off line 37 extends into the solution tank 26, and terminates in an L-shaped connection to a short vertical pipe 35, said vertical pipe 35 extending upwardly through the bottom opening in the absorbing tower 20 for a short distance, and being opened at its upper end. The upper end of the pipe 35 is so located as to be substantially below the level of liquid in the solution tank 26, this level being indicated at 29. The upper end of the pipe 35, however, is substantially above the point 43 of the absorbing tower. At this point 43 in the absorbing tower 20, a short nipple is inserted on to which is fitted a pipe elbow 44, which in turn, leads into the upwardly extending vent pipe 45, which leads to the outer atmosphere.

In operation, the reducing valve 5 is opened sufficiently to permit the desired flow of gas through the pipe 9. The gas flows through the metering device 8 filling the auxiliary chamber 10, and pulsating through the "bubbler" mechanism 12, thence filling the auxiliary chamber 14 and flowing outward into the pipe 11. Meanwhile, the main water line valve 13 has been opened to permit the desired flow of water from the main line. The valve 15 is then opened sufficiently to allow a flow of water into the ejector mechanism 17. The ejector mechanism 17 has a restricted passageway through its interior, sometimes known as a Venturi constriction. The pipe 18 leads off the ejector below the narrowest point of the constriction so that when water flows through the constriction, the change of velocity of that flow exerts a vacuum on the arm 18 of the ejector. The flow of water through valve 15 is, therefore, adjusted to such a speed as will pull a desired vacuum. Since the vacuum is proportional to the speed of the water coming through the valve 15, the gauge 19 by registering that speed will indicate the amount of this vacuum on the arm 18. Since the arm 18 of the injector 17 is connected to the inflow pipe 11, the absorbable gas is drawn through the pipe 11 into the injector mechanism 17, and expelled together with the flow of water through the injector 17 into the absorption tower 20. A certain amount of absorption of gas in the water takes place inside the injector mechanism itself. If, however, comparatively large amounts of gas are desired, it will be clear that this absorption is inadequate for the purpose. Therefore, the gas entering the absorption chamber 20 will be further absorbed in the water coming through the injector mechanism 17 by the operation of this absorption tower. If relatively small amounts of gas are used, the absorption tower will operate satisfactorily without the use of anything more than the cylindrical surface of its walls. If, however, it is desired to increase the capacity of the apparatus, the absorption tower may be filled with coke blocks or other chemically inert materials, over which the downwardly flowing water will pass. The amount of effective absorption surface will thereby be substantially increased and permit more rapid absorption, or absorption of greater amounts of gas. The gas saturated liquor flows out of the opened bottom end of the absorbing tower into the solution tank 26. Since the solution tank is provided with a constant level apparatus, admitting water through the pipe 23 and the constant level valve 25, a fixed volume of water may be continuously maintained in the solution tank. By adjusting the rate of flow of gas and the rate of flow of water through the injecting mechanism together with an appropriate adjustment of the inflow of water into the solution tank, it is possible to provide a continuous supply of gas-treated solution of predetermined concentration to the point of application through the draw-off line 37.

The above apparatus is adapted to be used in connection with various absorbable gases, such as chlorine or ammonia. It may be seen that any of these gases, if allowed to escape uncontrolled through carelessness or failure of the apparatus, might result in serious harm to surrounding equipment, or even to human beings in proximity thereto. Thus, our apparatus has been provided with a number of simple but absolutely effective safety features. The "bubbler" mechanism itself involves a number of safety features which are described in the co-pending application above referred to. An overflow pipe 33 is provided, which not only serves to maintain constant level in the absorption mechanism and solution tank, but prevents any undue overflow in case the outward flow through the valve 39 is obstructed. Furthermore, if the operator, in shutting down the apparatus, neglects to shut off the valve 39, the solution in the tank 26 will run out through the pipe 35 and the pipe 37, and the level of solution in the tank will drop, but since the tube 35 extends upwardly into the absorbing tower, the level will never drop below the mouth of this tube, which is, of course, above the level of the opening at the bottom of the absorbing tower. Therefore, a water seal will be maintained in the solution tank, and any gas which tends to remain in the absorbing tower will not escape into the room by passing upward through the top of the solution tank 26. If, for any reason, the gas pressure in the absorber will be built up, thereby forcing the level of liquid inside the absorber downwardly, the rising level of liquid outside the absorber in the solution tank 26 would be accommodated by the overflow pipe 33. Meanwhile, the level inside the absorber will be driven downward past the mouth of the tube 15, but as soon as the level reaches the point 43, the opening into the vent pipe 45 will be unsealed and the pressure will be relieved by the passage of the gas through the vent pipe to the outside atmosphere. This feature will tend to protect the apparatus, for instance, from the negligent failure to shut off the gas supply when shutting down the device.

The above description sets forth the operation of the device as used in the preparation of a chlorine water treating solution, but it will be seen that various modifications of my invention may be made. For instance, by superimposing upon this device a soda-liquor tank, and allowing soda-liquor to be fed therefrom into the solution tank either alone or together with raw water, it will be possible to prepare solutions of sodium hypochlorite, using chlorine as the incoming gas. It is also possible to place soda blocks in the solution tank to achieve this purpose. It will also be possible to prepare solutions of ammonium hydroxide by using ammonia instead of chlorine in the above described apparatus. Furthermore, it would even be possible, if desirable, to prepare solutions of ammoniated brine by combining a brine solution tank with the apparatus, as above described.

It will be understood that the foregoing description discloses merely a preferred embodiment of this invention, and that this invention may be practiced by the substitution of other equivalents for the elements above disclosed without departing from the spirit and scope of this invention.

What is claimed as new and desired to be secured by Letters Patent is:

1. In a gas dispensing apparatus, an absorbing means comprising a tower, means connected to said tower for introducing therein a constant controlled flow of absorbing liquid, means for introducing the gas into said absorbing tower in a continuous flow, said absorbing tower having interior surfaces over which the inflowing liquid and the inflowing gas pass downwardly, said absorbing tower being open at its bottom, means at the bottom of said absorbing tower forming a liquid seal across the open bottom of said absorbing tower whereby any unabsorbed free gas in the absorbing tower will not escape therethrough, vent means connected to said absorbing tower near the bottom thereof, but below the normal level of the liquid seal in the absorbing tower whereby said vent means will be sealed and inoperative during normal operation of the absorbing tower, but will operate to conduct free gas in the absorbing tower out to the atmosphere when the liquid seal drops in the absorbing tower.

2. In a gas dispensing apparatus, an absorbing tower, means for introducing absorbing liquid and absorbable gas at the top of the tower into intimate physical contact therewithin, said absorbing tower being open at the bottom, means disposed at the bottom of said absorbing tower to maintain a normal liquid level around the outside of said absorbing tower and inside thereof appreciably upward into said absorbing tower, means for drawing off the gas-containing liquid from the absorbing tower, said means being inserted upwardly through the open bottom of said absorbing tower, and having its mouth at a distance substantially above the bottom end of said absorbing tower and below said normal liquid level.

3. In a gas dispensing apparatus, an absorbing tower, means for introducing absorbable gas and absorbing liquid at the top of the tower into intimate physical contact therewithin, means disposed at the bottom portion of said absorbing tower to maintain a normal liquid level both inside and outside of said absorbing tower above the bottom thereof, means inserted within said absorbing tower for drawing off the gas containing liquid, vent pipe means communicating with said absorbing tower near the bottom thereof, the opening of said vent means being substantially below said normal liquid level, and also below the level of the opening into the draw-off means.

4. In a gas dispensing apparatus, means for indicating a flow of gas from a source of supply in combination with an absorbing tower, means associated with said absorbing tower for continuously introducing liquid into said absorbing tower, said last named means being adapted to draw off the gas from the flow indicating means simultaneously with the introduction of liquid into the absorbing tower whereby to introduce into the absorbing tower a stream of liquid and gas intimately intermixed, and a solution tank, said absorbing tower being in communication with said solution tank, means to add an additional flow of fresh absorbing water into said tank, means associated with said solution tank for maintaining a constant diluting liquid level in said solution tank, and means for drawing off the treated liquid from said device.

5. In a gas dispensing apparatus, an absorbing means comprising a tower, means connected to said tower for introducing therein a constant controlled flow of absorbing liquid, means for introducing the gas into said absorbing tower in a continuous flow, said absorbing tower having interior surfaces over which the inflowing liquid and the inflowing gas pass, said absorbing tower having an opening adjacent to its bottom, means at the bottom of said absorbing tower forming a liquid seal across said opening of said absorbing tower whereby any unabsorbed free gas in the absorbing tower will not escape therethrough, and vent means connected to said absorbing tower below the normal level of the liquid seal in the absorbing tower whereby said vent means will be sealed and inoperative during normal operation of the absorbing tower but will operate to discharge free gas from the absorbing tower when the liquid seal drops in the absorbing tower.

6. In a gas dispensing apparatus, an absorbing tower, means for introducing absorbing liquid and absorbable gas at the top of the tower into intimate physical contact therewithin, said absorbing tower having a discharge opening adjacent the bottom, means disposed adjacent to the bottom of said absorbing tower to maintain a normal liquid level around the outside of said absorbing tower to a height sufficient to seal said opening and inside thereof upward into said absorbing tower, means for drawing off the gas-containing liquid from the absorbing tower, said means being inserted upwardly through the discharge opening of said absorbing tower, and having its mouth at a distance substantially above the bottom end of said absorbing tower and below said normal liquid level.

7. In a gas dispensing apparatus, an absorbing tower, means for introducing absorbing liquid and absorbable gas into the tower into intimate physical contact therewithin, said absorbing tower having an opening adjacent the bottom thereof, means disposed adjacent the bottom of said absorbing tower to maintain a normal liquid level around the outside of said absorbing tower, and means for drawing the gas containing liquid from the absorbing tower and having its mouth within said absorbing tower above the bottom thereof and below the normal liquid level therein.

8. In a gas dispensing apparatus, an absorbing means comprising a tower, means connected to said tower for introducing therein a flow of absorbing liquid and absorbable gas into intimate physical contact within the tower, said absorbing tower having an opening adjacent its bottom, means at the bottom of said absorbing tower forming a liquid seal across said opening whereby unabsorbed free gas in the absorbing tower will not escape therethrough, means for withdrawing the treated liquid, and vent means connected to said absorbing tower adjacent the bottom thereof, but below the normal liquid level of said liquid seal, whereby said vent means will be sealed and inoperative during normal operation of the absorbing tower but will operate to discharge gas when the liquid seal drops in the absorbing tower.

9. In a gas dispensing apparatus, an absorbing tower, means for introducing absorbing liquid and absorbable gas into the tower into intimate physical contact therewithin whereby to permit the absorbing liquid to absorb the gas, said absorbing tower having an opening adjacent the bottom thereof, a tank containing a body of said absorbing liquid disposed adjacent the said opening and having a normal liquid level thereabove, whereby to form a liquid seal for said opening, means to withdraw a treated liquid from within said tower, and means to introduce a portion of the liquid to be withdrawn in the said body of liquid in said tank whereby to maintain a flow normally inwardly of said opening and normally prevent egress of said gas containing liquid from the tower and into the said body of liquid.

10. In a gas dispensing apparatus, an absorbing tower, means for introducing absorbing liquid and absorbable gas into the tower into intimate physical contact therewithin whereby to permit the absorbing liquid to absorb the gas, said absorbing tower having an opening adjacent the bottom thereof, a tank containing a body of said absorbing liquid disposed adjacent the said discharge opening and having a normal liquid level thereabove whereby to form a liquid seal for said opening, means for introducing additional absorbing liquid into said tank exteriorly of the tower, and discharge means substantially within the tower to withdraw the treated liquid to a point of utilization.

ROY BLAIR EVERSON.